A. J. SAVOIE.
ROTARY ENGINE.
APPLICATION FILED MAR. 1, 1910.

961,026.

Patented June 7, 1910.
2 SHEETS—SHEET 1.

Witnesses
Byron B. Collings.
Geo. A. Pynce.

Inventor
A. J. Savoie,
By Wilkinson,
Fisher & Witherspoon
Attorneys,

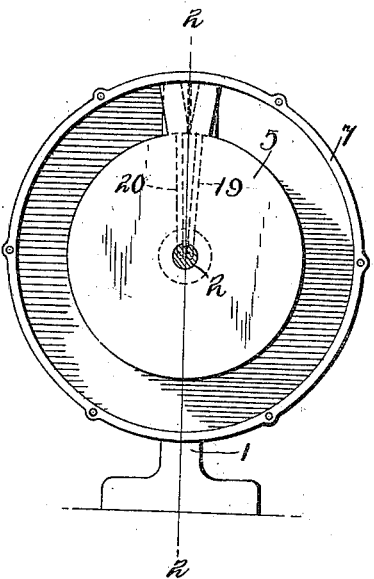
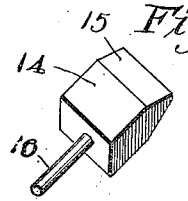
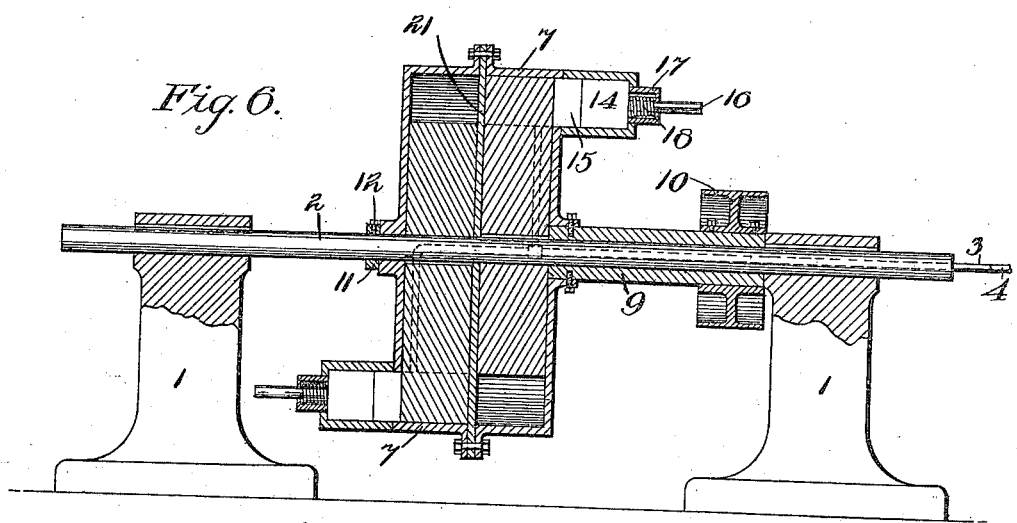
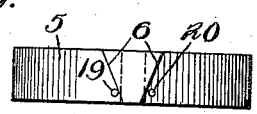

UNITED STATES PATENT OFFICE.

ANATOLE J. SAVOIE, OF GLENCOE, LOUISIANA.

ROTARY ENGINE.

961,026.  Specification of Letters Patent.  Patented June 7, 1910.

Application filed March 1, 1910. Serial No. 546,656.

*To all whom it may concern:*

Be it known that I, ANATOLE J. SAVOIE, a citizen of the United States, residing at Glencoe, in the parish of St. Mary and State of Louisiana, have invented certain new and useful Improvements in Rotary Engines; and I do hereby declare the following to be a full, clear, and exact description of the invention, such as will enable others skilled in the art to which it appertains to make and use the same.

My invention relates to improvements in rotary engines in which the rotary part of the engine itself acts as a fly wheel, thus doing away with the necessity of fly wheels and providing a simple device from which power may be obtained.

The object of my invention is to provide a simple rotary device in which the casing of the engine takes the place of a fly wheel.

With this object in view, my invention consists in the construction and combinations of parts as hereinafter described and claimed.

Figure 1:
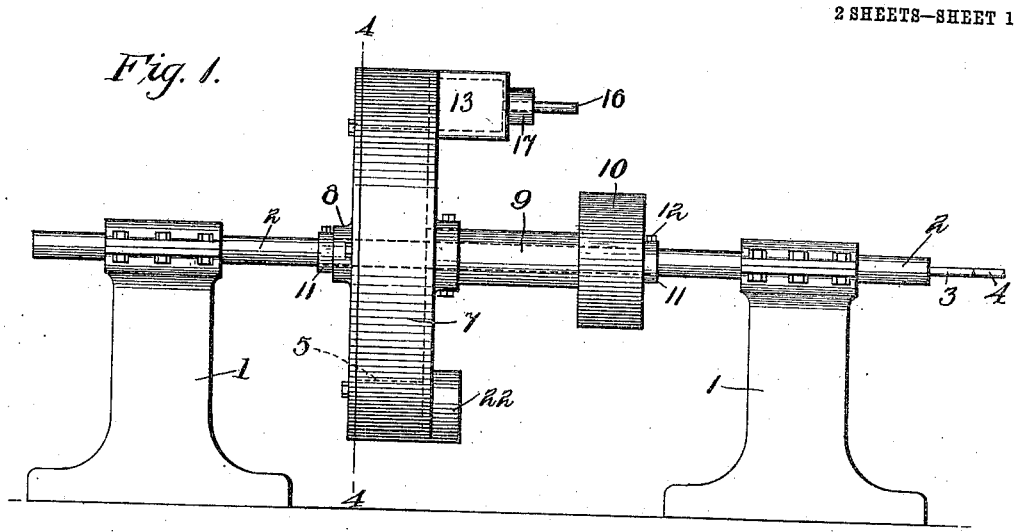
Figure 2:
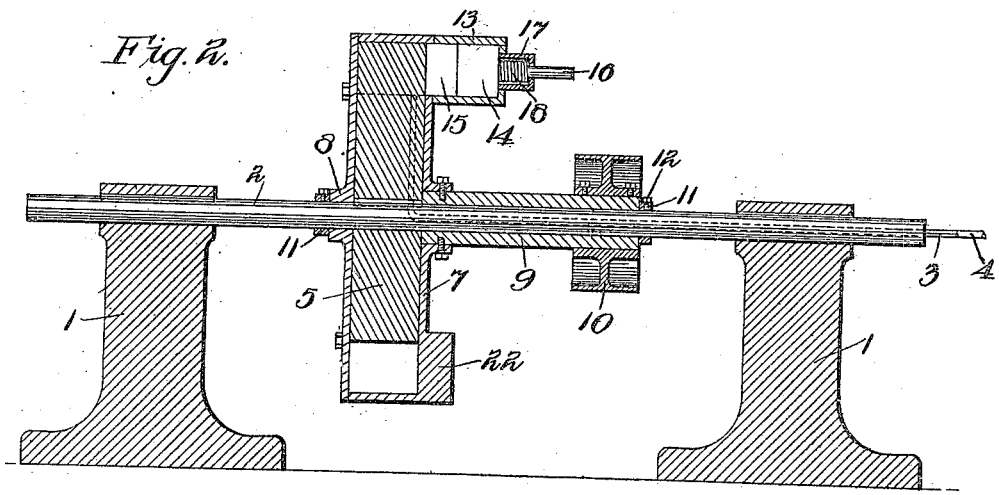
Figure 3:
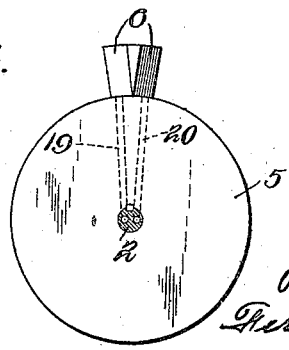

In the accompanying drawings—Figure 1 is a side elevation of my improved engine. Fig. 2 is a longitudinal section thereof, taken on the line 2—2 of Fig. 4. Fig. 3 is a side view of the deflector disk. Fig. 4 is a cross-section thereof on the line 4—4 of Fig. 1. Fig. 5 is a perspective view of the movable abutment. Fig. 6 is a longitudinal view of a modified, double form, and Fig. 7 is a top view of the deflector disk.

1 represents suitable supports, in which is mounted a shaft 2, which may be keyed to said support or otherwise prevented from rotation. A part of this shaft is hollow, and connecting with the hollow parts thereof are steam pipes 3 and 4, one being an inlet pipe and the other a discharge pipe. Keyed or otherwise fastened to the shaft 2 is a deflector disk 5, made circular in shape except at one point, where it is provided with a projection having beveled sides 6. Surrounding the deflector disk 5, is a casing 7, preferably made in the form of a short cylinder, having a strengthening boss 8 on one side, through which the shaft passes, and having a long sleeve 9 fastened in extensions around a central perforation on the other side. To the sleeve 9 is keyed, or otherwise fastened, a pulley 10, and stops 11, provided with set screws 12, prevent the longitudinal motion of said casing on the shaft 2. As hereinafter described, the casing 7, sleeve 9, and pulley 10 all revolve together.

Attached to the casing is an extension 13, in which is mounted an abutment disk 14, having its ends beveled as shown at 15, and provided with a projecting pin 16, which passes through a smaller extension 17 in the extension 13 in the casing, and which is surrounded by a spring 18, which normally tends to force the abutment toward the main part of the cylinder until it is driven out by the inclined faces 6 of the projection on the deflector disk, as hereinafter described.

22 represents a weight attached to the cylinder 7, or a thickened portion thereof, located opposite to the extension 13 for the purpose of counterbalancing it.

The deflector disk is provided with two passages 19 and 20, which connect with the steam pipes 3 and 4, respectively, and whose open ends are in proximity to the beveled or inclined faces 6 of the projection on the deflector disk.

The modification shown in Fig. 6 is substantially the same in principle, except that there are two casings 7 bolted together and separated by a partition 21, and the deflector disks in the two halves are oppositely located, as shown in Fig. 6.

The operation is as follows:—Steam being admitted through the pipe 3, for example, passes up through the passage 19 and bears against the abutment 14. The disk 5 being fixed to the stationary shaft 2, the steam causes the casing, together with the sleeve 9 and pulley 10, to revolve on said shaft until almost a complete revolution has been made, the steam pressing against the projecting portion of the deflector disk and against the abutment 14. When the inclined faces 15 of the abutment 14 strike the inclined faces 6, the abutment is forced outwardly from the casing against the tension of the spring 18, allowing the abutment to pass by the projection on the deflector disk, whereupon the discharge passage 20, which connects with the pipe 4, is uncovered. The operation is then repeated indefinitely. To reverse the motion of the engine, it is only necessary to make the pipe 4 the inlet pipe, and the pipe 3 the discharge pipe for the steam. Suitable means, not shown, may be employed for lubricating the machine. By a simple rearrangement, the casing 7 may be held stationary and the deflector disk 5 caused to revolve, the principle in either case being the same.

I claim:—

1. In a rotary engine, the combination of a shaft, a deflector disk, provided with a projection, keyed to said shaft, said projection having inclined faces, a casing having a spring-pressed sliding abutment provided with inclined faces, and means for admitting and discharging a motor fluid to cause relative motion between said casing and said disk, substantially as described.

2. In a rotary engine, the combination of a stationary shaft, a deflector disk fastened thereto and having on its circumference a projecting portion provided with beveled faces, said disk being bored out to provide passages which extend substantially from the center thereof to each of said beveled faces, steam supply and discharge pipes connected with said passages, a rotary cylinder mounted on said shaft, said cylinder having an extension on one side and a counter-balance on the other, a spring-pressed sliding abutment mounted in said extension, said abutment having beveled faces, and a sleeve and pulley connected to said casing, substantially as described.

In testimony whereof, I affix my signature, in presence of two witnesses.

ANATOLE J. SAVOIE.

Witnesses:
A. W. BOUVILLAIN,
WILLIAM CROPPER.